(12) United States Patent
Meyrath et al.

(10) Patent No.: US 11,373,804 B2
(45) Date of Patent: Jun. 28, 2022

(54) CAPACITOR STRUCTURE AND POWER MODULE HAVING A POWER ELECTRONIC COMPONENT

(71) Applicant: Siemens Aktiengesellschaft, Munich (DE)

(72) Inventors: Wilhelm Meyrath, Vienna (AT); Franz Pfleger, Vienna (AT); Peter Prankh, Groß-Enzersdorf (AT); Jörg Strogies, Berlin (DE); Bernd Müller, Falkenberg (DE); Klaus Wilke, Berlin (DE); Matthias Heimann, Potsdam (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 13 days.

(21) Appl. No.: 16/967,610

(22) PCT Filed: Jan. 30, 2019

(86) PCT No.: PCT/EP2019/052266
§ 371 (c)(1),
(2) Date: Aug. 5, 2020

(87) PCT Pub. No.: WO2019/154695
PCT Pub. Date: Aug. 15, 2019

(65) Prior Publication Data
US 2021/0090798 A1      Mar. 25, 2021

(30) Foreign Application Priority Data
Feb. 6, 2018    (EP) .................................... 18155370

(51) Int. Cl.
*H01G 2/10*      (2006.01)
*H01G 4/38*      (2006.01)
(Continued)

(52) U.S. Cl.
CPC ............. *H01G 2/106* (2013.01); *H01G 2/065* (2013.01); *H01G 2/08* (2013.01); *H01G 2/22* (2013.01); *H01G 4/30* (2013.01); *H01G 4/38* (2013.01)

(58) Field of Classification Search
None
See application file for complete search history.

(56) References Cited

U.S. PATENT DOCUMENTS 6,297,960 B1 * 10/2001 Moden ................ H01L 23/3675
                                                     257/724
6,954,368 B1 * 10/2005 Francoeur ............. H02M 7/003
                                                     361/763
(Continued)

FOREIGN PATENT DOCUMENTS

CN       1507658 A      6/2004     ......... H01L 21/8242
CN    102844816 A    12/2012     ............. G11C 11/24
(Continued)

OTHER PUBLICATIONS

Search Report for International Application No. PCT/EP2019/052266, 11 pages, dated May 7, 2019.
(Continued)

*Primary Examiner* — Dion R. Ferguson
(74) *Attorney, Agent, or Firm* — Slayden Grubert Beard PLLC (57) ABSTRACT

Various embodiments include a capacitor structure comprising: a plurality of capacitors disposed in a support structure, wherein each of the plurality of capacitors includes a first capacitor electrode and a second capacitor electrode. The support structure includes a first electrode and a second electrode. Each of the plurality of capacitors makes electrical contact with the first electrode via the respective first capacitor electrode and with the second electrode via the respective second capacitor electrode. The support structure
(Continued)

includes a mounting side for surface mounting, the mounting side comprising a first contact area of the first electrode and a second contact area of the second electrode. The support structure defines a cuboid interior and the capacitors are disposed in the cuboid interior. An outer side of the support structure defines an additional structural framework outside the mounting side.

13 Claims, 4 Drawing Sheets

(51) Int. Cl.
*H01G 2/06* (2006.01)
*H01G 2/08* (2006.01)
*H01G 2/22* (2006.01)
*H01G 4/30* (2006.01)

(56) References Cited

U.S. PATENT DOCUMENTS

| | | | |
|---|---|---|---|
| 6,974,987 B2 | 12/2005 | Ogawa et al. | 257/296 |
| 7,521,788 B2* | 4/2009 | Bang | H01L 25/105 |
| | | | 257/686 |
| 7,881,086 B2* | 2/2011 | Nakayama | H02M 7/003 |
| | | | 363/144 |
| 8,188,786 B2 | 5/2012 | Hsu et al. | 327/594 |
| 8,988,857 B2 | 3/2015 | Mcconnell et al. | 361/308.1 |
| 9,042,079 B2 | 5/2015 | Masuda et al. | 361/306.3 |
| 9,260,946 B2* | 2/2016 | Sneisen | H01M 6/42 |
| 9,305,732 B2 | 4/2016 | Murowaki et al. | |
| 9,601,274 B2 | 3/2017 | Kojima et al. | |
| 2002/0088977 A1 | 7/2002 | Mori | H01L 27/108 |
| 2003/0031914 A1 | 2/2003 | Frank et al. | 429/435 |
| 2007/0190409 A1* | 8/2007 | Sakurai | H01G 2/14 |
| | | | 429/159 |
| 2009/0140400 A1 | 6/2009 | Amey, Jr. et al. | 257/664 |
| 2010/0134947 A1* | 6/2010 | Goudy, Jr. | H01G 2/08 |
| | | | 361/274.2 |
| 2011/0220979 A1 | 9/2011 | Kawashima et al. | 257/296 |
| 2012/0134069 A1* | 5/2012 | Dooley | H01G 4/236 |
| | | | 361/330 |
| 2013/0107423 A1* | 5/2013 | Nieva Fatela | H01G 11/10 |
| | | | 361/434 |
| 2013/0343027 A1* | 12/2013 | Perea | H01C 1/14 |
| | | | 361/813 |
| 2014/0127535 A1* | 5/2014 | Schaefer | H01G 2/04 |
| | | | 429/50 |
| 2015/0137238 A1 | 5/2015 | Tsunemi et al. | 257/347 |
| 2015/0173248 A1 | 6/2015 | Zeng | 361/709 |
| 2016/0174356 A1 | 6/2016 | Singh et al. | H05K 1/02 |
| 2016/0181996 A1* | 6/2016 | Baecklund | H03F 3/22 |
| | | | 330/44 |
| 2017/0169955 A1 | 6/2017 | Miller | H01G 4/38 |
| 2017/0236643 A1 | 8/2017 | Peuser | H01G 4/228 |
| 2017/0345579 A1 | 11/2017 | Eidelman | H01G 9/042 |
| 2017/0367228 A1* | 12/2017 | McConnell | H01G 2/06 |
| 2018/0206359 A1 | 7/2018 | Mcpherson et al. | |

FOREIGN PATENT DOCUMENTS

| | | | |
|---|---|---|---|
| CN | 103632844 A | 3/2014 | H01G 4/248 |
| CN | 103999176 A | 8/2014 | H01G 4/12 |
| CN | 104021933 A | 9/2014 | H01G 2/06 |
| CN | 104064351 A | 9/2014 | H01G 2/00 |
| CN | 104081508 A | 10/2014 | H01L 21/02 |
| CN | 105006976 A | 10/2015 | H01G 4/005 |
| CN | 206 117 523 | 4/2017 | H02M 7/00 |
| DE | 91 07 692 | 8/1991 | H02M 1/00 |
| DE | 42 32 763 | 12/1995 | H02M 1/00 |
| DE | 697 15 214 | 4/2003 | H02M 7/00 |
| DE | 10 2014 101 024 | 12/2014 | H01G 2/02 |
| EP | 0 914 708 | 9/2002 | H02M 7/00 |
| JP | 2005150764 A | 6/2005 | H01G 2/06 |
| WO | 2008 134251 | 11/2008 | H02B 1/30 |
| WO | 2016 058741 | 4/2016 | H01G 4/228 |

OTHER PUBLICATIONS

Search Report for DE Application No. 10 2018 201 842.1, 10 pages, dated Sep. 26, 2018.
Search Report for International Application No. PCT/EP2019/050781, 24 pages, dated Mar. 14, 2019.
Chinese Office Action, Application No. 201980011594.7, 7 pages, dated May 27, 2021.
U.S. Non-Final Office Action, U.S. Appl. No. 16/967,655, 24 pages, dated Jul. 8, 2021.
Chinese Office Action, Application No. 201980011594.7, 7 pages, dated Nov. 12, 2021.
U.S. Notice of Allowance, U.S. Appl. No. 16/967,655, 18 pages, dated Nov. 17, 2021.

* cited by examiner

CAPACITOR STRUCTURE AND POWER MODULE HAVING A POWER ELECTRONIC COMPONENT

CROSS-REFERENCE TO RELATED APPLICATIONS

This application is a U.S. National Stage Application of International Application No. PCT/EP2019/052266 filed Jan. 30, 2019, which designates the United States of America, and claims priority to EP Application No. 18155370.2 filed Feb. 6, 2018, the contents of which are hereby incorporated by reference in their entirety.

TECHNICAL FIELD

The present disclosure relates to capacitors. Various embodiments include power modules having a power electronic component mounted on a substrate board. The substrate board with the mounted power module may be in a package which can itself be mounted on another circuitry carrier as substrate. Power electronic components are frequently used in combination with capacitors, thereby implementing power electronic circuits.

BACKGROUND

Power electronic circuits usually have to be tailored to a given associated application. These applications differ individually, resulting in a considerable overhead for designing and manufacturing the power electronic circuits. The individual applications make it particularly difficult to automate the manufacture of power modules. In particular, the use of capacitors involves increased assembly cost/complexity, as required capacitance values can only be achieved by connecting a plurality of capacitors in parallel, all of which have to be incorporated in the power electronic circuit.

SUMMARY

Various embodiments of the teachings herein include a structure comprising a plurality of capacitors disposed in a support structure, wherein the capacitors each have a first capacitor electrode and a second capacitor electrode. The support structure itself has a first electrode and a second electrode. The capacitors are in electrical contact with the first electrode via their first capacitor electrodes and with the second electrode via their second capacitor electrodes. The support structure also has a mounting side for surface mounting. The mounting side is provided with a first contact area of the first electrode and with a second contact area of the second electrode so that electrical contact can be established with the support structure by surface mounting. The capacitor structure thus constitutes a surface-mountable assembly which can be placed onto a substrate, e.g. organic and inorganic substrates such as circuit boards, for example, for mounting and establishing electrical contact. Surface-mountable components, also known as SMDs (surface mount devices), are widely used in electronics assembly, as they allow ease of processing. The object of the invention is to further develop a capacitor structure and/or a power module wherein the capacitor structure/power module will enable power electronic circuits to be produced with reduced overhead in terms of design and manufacture, particularly in the case of one-off productions of power modules, i.e. low volumes. In some embodiments, the support structure encloses a cuboid interior in which the capacitors are disposed. An additional structural framework is also provided on an outer side of the support structure outside the mounting side.

For example, some embodiments include a capacitor structure comprising a plurality of capacitors (15) disposed in a support structure (18, 19, 55), wherein the capacitors (15) each have a first capacitor electrode (16) and a second capacitor electrode (17), wherein the support structure (18, 19, 55) has a first electrode (18) and a second electrode (19), the capacitors (15) are in electrical contact with the first electrode (18) via their first capacitor electrodes (16) and with the second electrode (19) via their second capacitor electrodes (17), the support structure (18, 19, 55) has a mounting side for surface mounting and the mounting side is provided with a first contact area of the first electrode (18) and with a second contact area of the second electrode (19) for establishing electrical contact with the support structure, characterized in that the support structure (18, 19, 55) encloses a cuboid interior in which the capacitors (15) are disposed, an additional structural framework (24, 25a, 25b, 30, 49, 56, 60, 63) is provided on an outer side of the support structure (18, 19, 55) outside the mounting side.

In some embodiments, the first electrode (18) and the second electrode (19) form opposite sidewalls (22) of the interior of the support structure (18, 19, 55), wherein the sidewalls (22) extend perpendicularly away from the first contact area and the second contact area, the capacitors (15) are disposed between the sidewalls (22).

In some embodiments, the structural framework has a reinforcing structure, in particular ribs (30).

In some embodiments, the structural framework has electrical pathways (56) running from the mounting side to an upper side (50) of the capacitor structure.

In some embodiments, the structural framework has a cooling structure (60).

In some embodiments, the structural framework has at least one sensor element (25), in particular a temperature sensor and/or a humidity sensor and/or a current sensor and/or an acceleration sensor.

In some embodiments, the structural framework has a circuitry carrier (24).

In some embodiments, a driver circuit (49) for at least one power electronic component (31) is implemented on the circuitry carrier (24).

In some embodiments, the structural framework has an electrical shielding structure (63) which at least partially encases the capacitor structure.

In some embodiments, the interior of the support structure (18, 19, 55) is encapsulated.

In some embodiments, the support structure (18, 19, 55) has an electrically insulating material (55) into which the first electrode (18) and the second electrode (19) are incorporated.

In some embodiments, at least one seating for the structural framework (24, 25a, 25b, 30, 49, 56, 60, 63) is formed from the electrically insulating material (55).

As another example, some embodiments include a power module comprising a power electronic component (31) which is mounted on a substrate board (12), characterized in that a capacitor structure as described herein is in electrical contact with the power electronic component (31).

In some embodiments, the power electronic component (31) is mounted on one side of the substrate board (12) and the capacitor structure on the other side of the substrate board (12).

BRIEF DESCRIPTION OF THE DRAWINGS

The drawings highlight various features of the teachings herein by illustrating particular embodiments thereof, but do not thereby limit the scope of the disclosure. In the figures.

DETAILED DESCRIPTION

The present disclosure describes support structures enabling capacitors to be disposed in the support structure while at the same time minimizing manufacturing cost/complexity. For example, the capacitors can be soldered to the electrodes or contact can be established in some other way so that a constructional unit is produced and the electrodes hold the capacitors together. In some embodiments, this provides a high capacitor packing density so that the capacitor structure is compact and, as a surface-mountable component, is easy to handle. In some embodiments, a low-inductance design of a power electronic circuit is possible using the arrangements described herein. The capacitor structure can be produced in large volumes and can then be used in power electronic circuits. The capacitors can also be categorized (binning) before they are combined into the capacitor structure. The capacitor structure can be tested prior to further use in order to determine its suitability for the power electronic circuit. The capacitor structure can then be surface-mounted with low manufacturing cost/complexity.

In some embodiments, the first electrode and the second electrode form sidewalls of the interior of the support structure. The sidewalls extend in each case perpendicularly from the first contact area and the second contact area. This means that the capacitors can be disposed between the sidewalls. The capacitors which are mounted in the interior have the capacitor electrodes on opposite sides and may themselves be cuboid-shaped. This produces tight packing inside the support structure with improved space utilization. The contact-making via the sidewalls also enables the capacitors to be connected in parallel using short contact paths, thereby allowing large conductor cross-sections to be implemented relative to the available space while at the same time ensuring short conductor lengths. This means that the parasitic inductance of the capacitor structure can be reduced.

In some embodiments, the capacitors can be stacked vertically in a plurality of levels in the support structure. A side-by-side arrangement is possible, wherein the available space in the power electronic circuit is optimally used, among other things because of the rectangular shape of the interior. The parallel-connected capacitors are in contact, via the sidewalls and the adjoining contact areas, with the substrate on which, for example, a power electronic circuit of which the capacitor structure forms part can be implemented.

In some embodiments, apart from the mounting side, the support structure also forms at least one outer side. Due to the cuboid interior which is at least partially enclosed by the support structure, up to five outer sides can be formed. These can consist of the lateral faces (formed by the sidewalls) with respect to the mounting side and a cover opposite the mounting side and forming the top side of the capacitor structure. In some embodiments, the capacitor structure can be used in any mounting orientation. The concepts lateral face, sidewalls, cover, and top side are to be seen as relative to the mounting side which forms the underside of the component with respect to the substrate during mounting.

The design of the support structure with at least partially parallel faces allows optimum space utilization and/or manufacture that lends itself to mass production. In some embodiments, flat surfaces are implemented as the support structure because they are readily usable as mounting surfaces. Providing an additional structural framework enables additional functionalities to be implemented for the capacitor structure. These functionalities make it easier to manufacture a power electronic circuit from prefabricated modules because production complexity that would arise from implementing these functionalities separately in the power electronic circuit can be eliminated as a result. This will be explained in greater detail in the following.

In some embodiments, the additional structural framework can be parts or functional components that are mounted separately on the support structure. Another possibility is to make the structural framework e.g. an integral part of the support structure. This is possible, for example, if the structural framework is implemented according to a particular embodiment of the teachings herein as a reinforcing structure, in particular as ribs. This enables the capacitor structure to be stabilized, thereby obviating the need for it to be connected, for example, to external reinforcing structures during assembly. This reduces the assembly cost/complexity involved.

In some embodiments, the structural framework has electrical pathways which run from the mounting side to an upper side of the capacitor structure. These pathways may provide contact with electrical or electronic functional components which are mounted on the upper side of the structural framework. These can then be placed in contact with the power electronic circuit on the substrate which is connected to the capacitor structure via the mounting side. This makes it possible to additionally incorporate electronic functionalities into the capacitor structure which can be mass-produced cost-effectively during the manufacture of standardized capacitor structures. This significantly reduces assembly costs/complexity for designing e.g. power electronic circuits, as the electronic functionality does not need to be installed separately during the manufacture of the power electronic circuit.

In some embodiments, in order to be able to use the pathways for an electronic functionality, the structural framework can contain a circuitry carrier. This can consist, for example, of a suitably structured organic and/or inorganic substrate (e.g. a circuit board). This then establishes the connection between the pathways and an electronic circuit. Proven technology can be used here, thereby minimizing production cost/complexity and maximizing reliability.

In some embodiments, a driver circuit for at least one power electronic component can be provided on the circuitry carrier. This produces a power module which can be combined with other power modules to create a power electronic circuit.

In some embodiments, the structural framework can also consist of a cooling structure. This is attached in a thermally conductive manner to the structure to be cooled so that short conduction paths for the heat generated are produced. This enables the cooling structure to be operated more efficiently, thereby providing space-savings. In addition, the pre-installed heatsinks reduce assembly cost/complexity when the capacitor structure is used in a power electronic circuit.

In some embodiments, the structural framework has at least one sensor element, in particular a temperature sensor and/or a humidity sensor and/or a current sensor and/or an acceleration sensor and/or a gas sensor. The sensor signals can be used to determine the operating state and/or operation-related changes in the capacitor structure (aging, damage, health monitoring) in order to obtain information regarding the operating state of the capacitor structure. This can include remaining service life or impending failure or overloading of the capacitor structure or power module. The sensor signals can be processed by an evaluation circuit in order to obtain this information.

In some embodiments, temperature sensors are used, for example, so that the operating temperature of the power modules can be monitored. This allows e.g. timely shutdown in order to prevent the power module from being overloaded or damaged. However, a temperature sensor can also be used to determine the ambient temperature of the power electronic circuit, and e.g. determine the likely cooling behavior. Humidity sensors can be used to monitor the operating conditions for the power electronic circuit. If the humidity is too high, the power electronic circuit must be dried before operation or further operation is possible. Excessively high humidity may occur, for example, due to the formation of dew at low external temperatures. Another possibility is leakage from the water cooling system.

In some embodiments, current sensors are used to monitor the operating state of the power electronic circuit. For example, the current loading in the individual power modules can be compared with one another. Current measurement may also be necessary, for example, for operating a driver circuit for the power modules (further details to follow).

The sensor element can also be implemented as an acceleration sensor. Acceleration sensors enable mechanical stresses on the power electronic circuit to be determined. For example, events may be logged which preclude continued operation of the power electronic circuit until maintenance has been carried out, e.g. because the power electronic circuit has fallen off in a mobile application. However, acceleration sensors can also be used to detect vibrations, for example. Depending on the frequency and magnitude of the vibrations, e.g. flexible maintenance intervals can be issued for the power electronic circuit.

In some embodiments, the structural framework can have an electrical shielding structure which at least partially encloses the capacitor structure. This makes it possible to protect electrical circuits from disturbance effects. Lastly the interior of the support structure can advantageously be encapsulated. Inorganic and organic potting compounds e.g. of silicone or cast resins can be used for this purpose, these themselves being electrically insulating. The advantage of encapsulation using a suitable encapsulating material is that the capacitor structure can be better protected against environmental effects (dust, moisture).

In some embodiments, the support structure consists of an electrically insulating material (particularly plastic) in which the first electrode and the second electrode are incorporated. These electrodes can be incorporated in different ways. For example, the first electrode and the second electrode can be overmolded by the insulating material. A thermoplastic or other functional plastic is particularly suitable for this purpose. The electrical contact areas provided for the capacitors and the contact areas for surface mounting remain exposed here so that an electrical connection can be established between the said components (e.g., by means of a soldered joint and/or a sintered joint and/or by conductive adhesive joining and/or metal spraying). Another possibility is to produce a housing individually from the material (e.g. by injection molding), said housing having seatings for the electrode. These can then be bonded or inserted or clipped in.

The electrically insulating material improves handling of the capacitor structure, as it can form a self-supporting construction even before mounting of the capacitors. The electrically insulating material also has the effect of improving the electrical insulation of the capacitor structure with respect to its environment. Moreover, the electrically insulating material may be robust, particularly if it is a plastic, so that the risk of the capacitor structure being damaged during mounting is minimized.

In some embodiments, at least one seating for the structural framework is formed from the electrically insulating material. By this means, the mounting of structural frameworks implemented as single components can be advantageously facilitated, thereby reducing assembly cost/complexity. In addition, the structural frameworks incorporated in the seating are advantageously well fixed, thereby not least improving the reliability of the capacitor structure as a whole. The seating can also be used as protection for the seated structural framework, which has a positive effect both during mounting and during operation of the capacitor structure.

In some embodiments, there is a capacitor structure of the type described above being in electrical contact with the power electronic component. As already described, many power electronic structures for power electronic components may be combined with capacitors (more details to follow). The capacitor structure is therefore suitable for manufacturing a power module with reduced assembly cost/complexity for the power module, as the capacitor structure can already be pre-mounted.

In some embodiments, the power electronic components are in the form of a bare chip. This can be in direct contact with the substrate board, e.g. by means of a sintered joint which also provides electrical contact. The substrate board can be made of a ceramic material. This does not conduct the electric current, thus simultaneously providing electrical insulation. An electronic circuit can therefore be implemented by patterning an electrically conducting coating on the substrate board. This means that, for example, contact areas are provided for contact-making of the power electronic components.

In some embodiments, the power modules can be combined into different configurations on the basic circuitry carrier with comparatively low cost/complexity in terms of design and assembly in order to implement power electronic circuits having different requirements. The basic circuitry carrier can be implemented as a circuit board, for example, wherein a circuit can be provided on the surface for establishing contact with the power modules used. However, the basic circuitry carrier can also consist e.g. of a housing section or the like, the housing then serving at the same time as a support body for implementing the power electronic circuit.

In some embodiments, the power electronic component is mounted on one side of the substrate board and the capacitor structure is mounted on the other side of the substrate board. Connections between the power electronic component and the capacitor structure can be provided, for example, by means of vias in the substrate board. The substrate board also allows simple mounting of the power module in a larger power electronic circuit, thereby reducing production cost/complexity. For example, it is possible to mount the substrate board populated with the at least one power electronic component on a basic circuitry carrier. Surface mount methods can be used here. If the power electronic component is a power chip, it can be placed in direct contact with the said basic circuitry carrier using the side facing away from the substrate board.

Further details of the teachings herein will now be described with reference to the accompanying drawings. Identical or corresponding drawing elements are provided with the same reference characters in each case and will only be explained more than once in so far as differences arise between the individual figures. The examples explained below are example embodiments of the teachings herein. In the examples, the described components of the embodiments in each case represent features of the teachings that are to be considered independently of one another and which also further develop the teachings independently of one another and are therefore also to be regarded individually or in a combination other than that shown as part of the embodiments. In addition, the embodiments described can also be supplemented by other of the already described features of the teachings.

Figure 1:
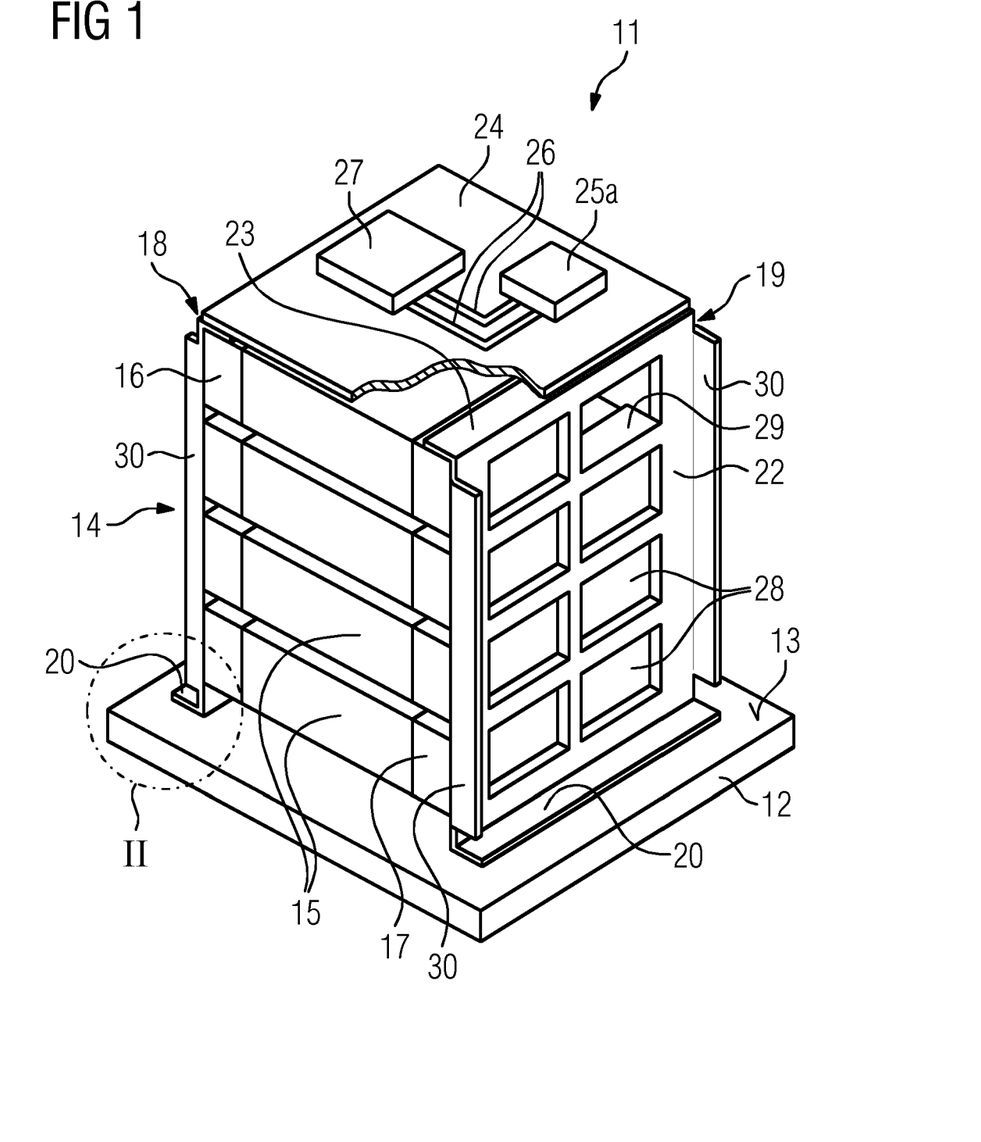
FIG. 1 shows an exemplary embodiment of a power module incorporating teachings of the present disclosure with an example of the capacitor structure incorporating teachings of the present disclosure in a three-dimensional view, partially cut open.

A power module 11 according to FIG. 1 has a substrate board 12 on whose visible upper side 13 a capacitor structure 14 has been mounted according to a surface-mounting method. The capacitor structure comprises eight capacitors 15 of which, however, only seven are shown in FIG. 1 (the capacitor disposed at upper right is missing; more details below). The capacitors 15 each have first capacitor electrodes 16 and second capacitor electrodes 17, wherein electrical contact between the first capacitor electrodes and a first electrode 18 and between the second capacitor electrodes 17 and a second electrode 19 is established by soldered joints or other material-bond or positive-fit connections. The first electrode 18 and the second electrode 19 also have respective contact structures 20, the lower sides of which form a first contact area on the first electrode and a second contact area on the second electrode (not visible in FIG. 1, as facing the upper side 13). Using the first contact area and the second contact area which together form the mounting side of the capacitor structure 14, the latter is mounted on the upper side of the substrate board 12 by means of a soldered joint 21 not shown in greater detail (cf. FIG. 2).

The first electrode 18 and the second electrode 19 together form a support structure for the capacitors 15. As the capacitors 15 are soldered to sidewalls 22 of the first electrode 18 and second electrode 19 by their first contact electrodes 16 and their second contact electrodes 17, the self-supporting capacitor structure 14 is produced even though the first electrode 18 and the second electrode 18 are not directly interconnected. Additional stability is achieved for the capacitor structure 11 by mounting on the substrate board 12. In addition, a circuitry carrier 24 is fixed on seating structures 23 of the first electrode 18 and second electrode 19 as an additional structural framework, wherein the circuitry carrier 24 establishes a connection between the first electrode 18 and the second electrode 19 and therefore stabilizes the support structure.

In some embodiments, windows 28 are punched into the sidewall 22 of the first electrode 18 (not visible in FIG. 1) and of the second electrode 19. These make it possible for tongues 29 to be folded into the interior of the support structure which facilitate positioning of the capacitors 15 and also enlarge the electrical contact area. As the capacitor at top right behind the sidewall 22 has been omitted, the tongue 29 can be seen there. In the other windows, the tongues are concealed by the second capacitor electrodes 17.

In some embodiments, a sensor element 25a which can be e.g. a temperature sensor or an acceleration sensor (or humidity sensor or gas sensor) is attached to the circuitry carrier 24. The sensor element 25a is connected via conductor tracks 26 on the circuitry carrier 24 to an evaluation circuit in the form of an integrated circuit 27. The integrated circuit 27 can analyze the sensor signal and provide it for further processing in a manner not shown in greater detail (e.g. via wired connections (not shown) or a wireless interface, i.e. via radio or infrared).

In some embodiments, as a further structural framework, ribs 30 are provided as a reinforcing structure on the lateral edges of the sidewall 22. These can be produced by bending over the lateral edges of the sidewalls 22. The first electrode 18 and the second electrode 19 can therefore be inexpensively produced as leadframes by punching and subsequent bending. The seating structures 23 and the contact structures 20 can also be produced by bending.

Figure 2:
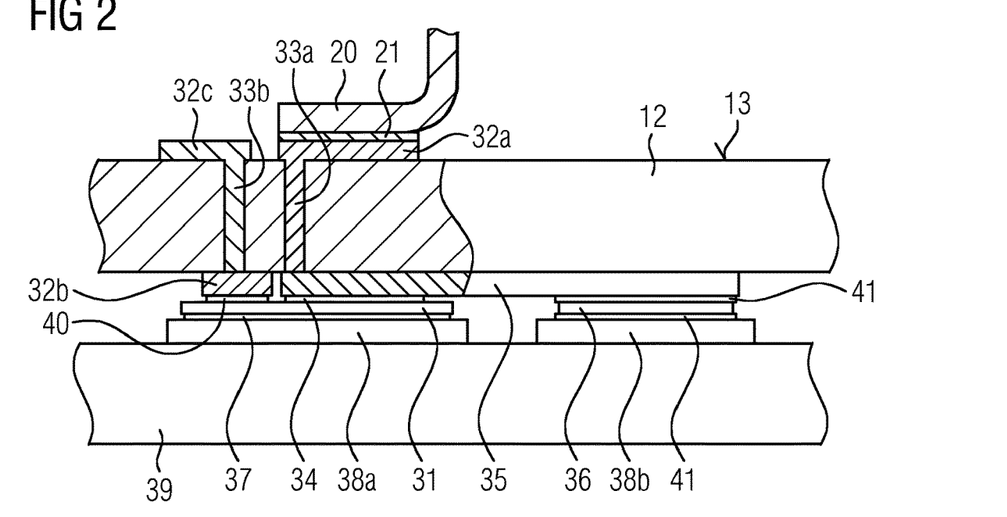
FIG. 2 shows the detail II according to FIG. 1, partially sectioned.

FIG. 2 shows how the capacitor arrangement 14 according to FIG. 1 can be placed in contact with a power electronic component 31 implemented as a transistor. For this purpose, the contact structure 20 is placed in contact with a contact pad 32a via the soldered joint 21, the contact pad 32a being placed in contact with a source electrode 34 of the power electronic component 31 via a via hole 33a. The source electrode 34 is also connected via a conductor track 35 to a spacer 36 having the same height as the power electronic component 31.

A drain electrode 37 of the power electronic component 31 is connected to a basic circuitry carrier 39 via a contact area 38a and the spacer 36 is connected thereto via a contact area 38b. The basic circuitry carrier 39 provides a baseplate on which the entire electronic circuit, comprising a plurality of power modules according to FIG. 1, is mounted (cf. also FIG. 3).

The power electronic component according to FIG. 2 is a transistor. To enable it to be switched, a gate electrode 40 is also necessary. To enable the latter to be controlled, there is provided in the substrate board 12 a via 33b which runs from a contact pad 32b to a contact pad 32c. The source electrode 34, gate electrode 40, drain electrode 37 as well as joining layers 41 on the spacer 36 are implemented as sintered joints.

Figure 3:
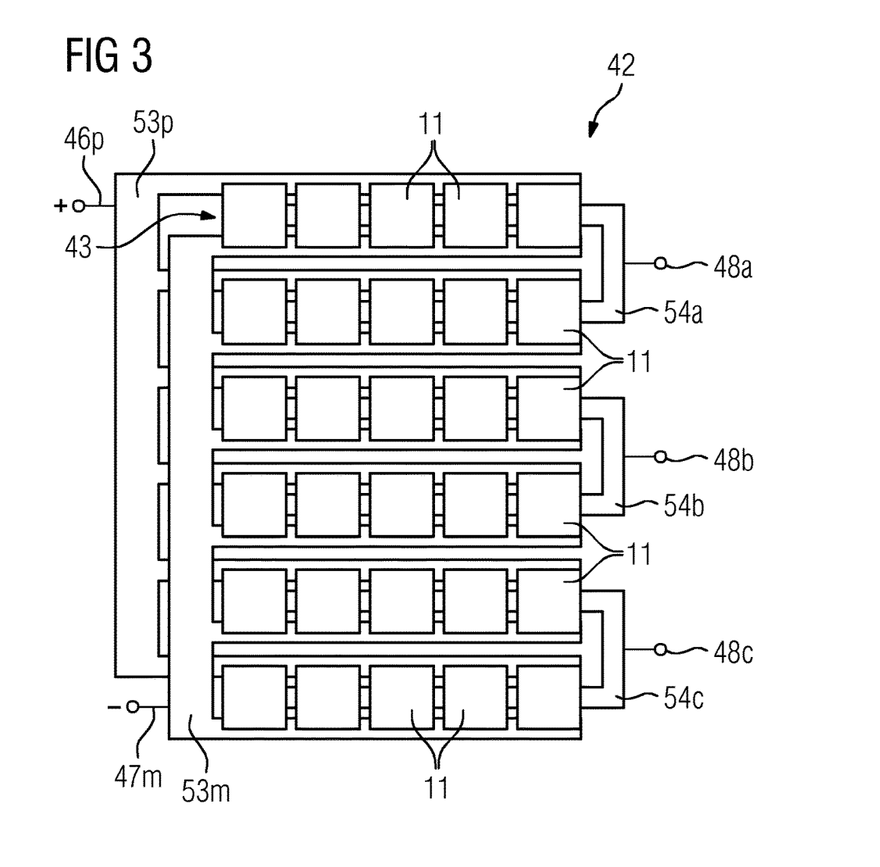
FIG. 3 shows a plan view of a power electronic circuit having a plurality of power modules which can be structured according to FIG. 1 or in a similar manner.
Figure 6:
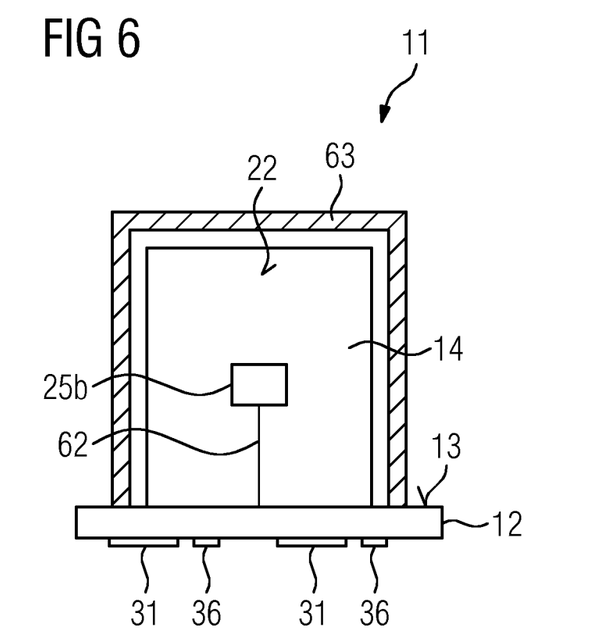
FIG. 6 shows a side view, partially cut open, of a last example of a power module incorporating teachings of the present disclosure with an example of the capacitor structure incorporating teachings of the present disclosure.

FIG. 3 shows how a plurality of power modules 11 can be combined into a power electronic circuit 42 on a basic circuitry carrier 39 according to FIG. 2. Five power modules 11 are configured in a row 43 in each case, a total of six rows being provided. As can be seen from FIG. 2, only the left-hand side of the substrate board 12 is shown, the right-hand side having another power electronic component 31 (as shown in FIG. 6). This means that on the side not shown of the substrate board according to FIG. 2, a transistor is likewise installed as a power electronic component. This provides a contact-making possibility which is implemented in FIG. 3 for each power module 11 and schematically illustrated in FIG. 4 as a circuit diagram.

Figure 4:
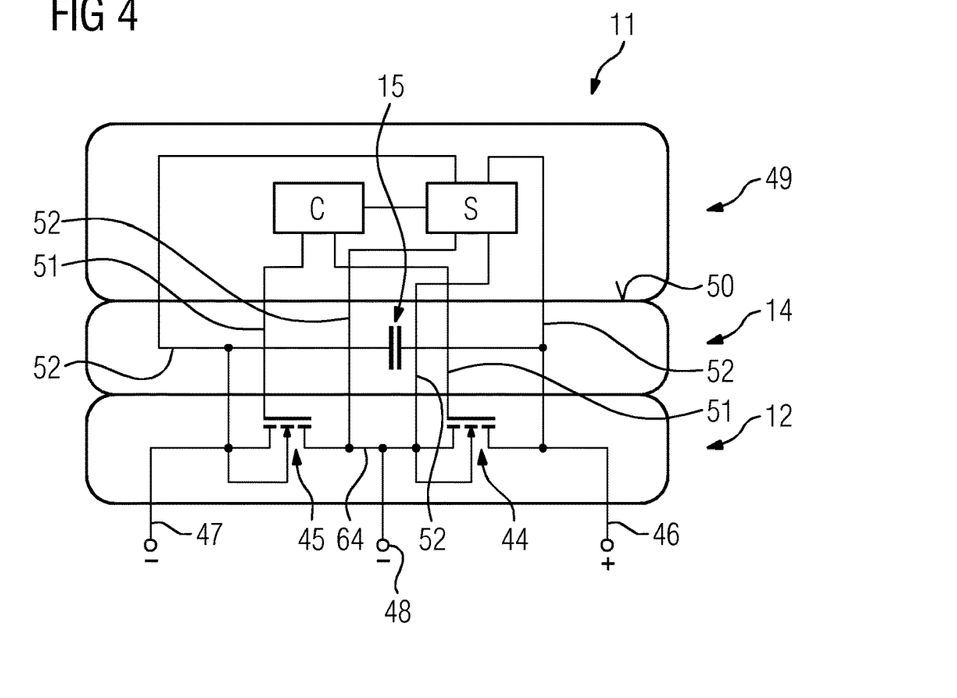
FIG. 4 shows a schematic circuit diagram for a contact arrangement of power modules according to FIG. 1 in a power electronic circuit according to FIG. 3.

In FIG. 4, the capacitor 15 is shown as a substitute for the entire capacitor structure according to FIG. 1. This serves to simplify the representation, wherein alternatively a plurality of capacitors connected in parallel can also be used. The capacitor 15 according to FIG. 4, like the capacitor structure 14, is only shown schematically. It behaves in the same way with the substrate board 12 and the power electronic components mounted thereon which are constituted by a first transistor 44 and a second transistor 45. The first transistor 44 is connected by its source electrode to the positive terminal 46, also termed high-side, while the second transistor 45 is connected by its drain electrode to the negative terminal 47, also termed low-side. The drain electrode of the first transistor 44 and the source electrode of the second transistor 45 are interconnected, thereby producing a half-bridge 64 with a phase contact 48.

Figure 5:
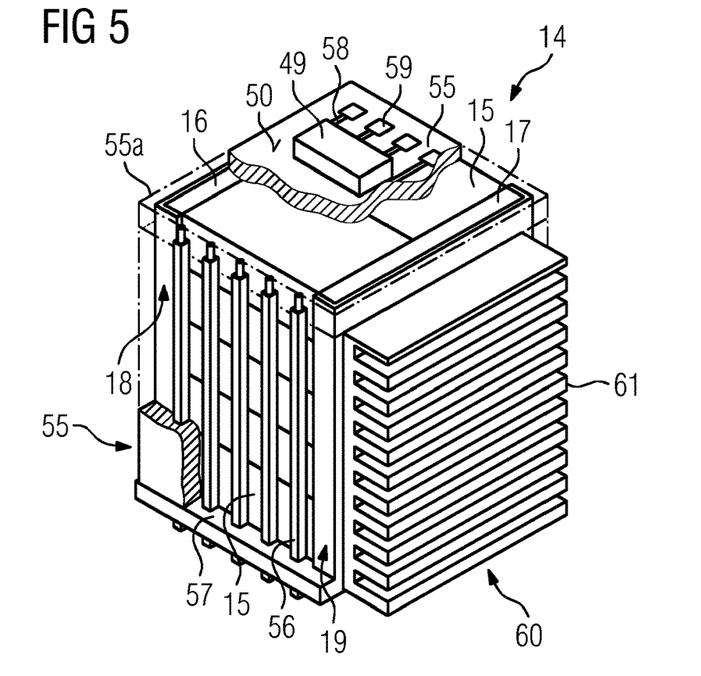
FIG. 5 shows another three-dimensional view, partially cut open, of a capacitor structure incorporating teachings of the present disclosure.

To control the power module 11, the capacitor structure 14 is provided with a driver circuit 49 which can be accommodated, for example, on an upper side 50 of the capacitor structure 14 as shown in FIG. 5. The driver circuit according to FIG. 4 is only schematically illustrated in order to describe its function in principle. The driver circuit has a controller function C and also a sensor function S. The controller function is provided by contact lines 51 as interface to the gate electrodes of the first transistor 44 and the second transistor 45. The driver circuit can therefore drive the two transistors more intelligently as switches. The information necessary for this function is provided by the sensor function S. The sensor function is provided via signal lines 52 with which a current flow upstream and downstream of the capacitor 15 and upstream and downstream of the phase contact 48 in the half-bridge 64 can be tapped.

The capacitor 15 is connected to the positive terminal 46 and the negative terminal 47 and therefore provides a smoothing function which is required for multiphase operation of the power electronic circuit 42 according to FIG. 3. As can be seen from FIG. 3, the power electronic circuit 42 according to FIG. 3 is of modular design. By means of the circuit implemented by the power modules 11 according to FIG. 4, these can be used jointly in three groups in order to produce, from a DC voltage present at the common positive terminal 46p and at the common negative terminal 47m, a three-phase AC voltage which can be tapped at the common phase contacts 48a, 48b, 48c. The magnitude of the maximum current to be switched determines how many of the power modules 11 need to be used for each phase. According to FIG. 3, this is ten power modules 11 per phase.

As can be seen, the electrodes 53m, 53p of the positive terminal 46p and negative terminal 47m are in a comb-like arrangement, so that each first transistor 44 of each power module 11 can be contacted by the electrode 53p forming the positive terminal 46p and each second transistor 45 of each power module 11 can be contacted by the electrode 53m the negative terminal 53m. The phase contacts 48a, 48b, 48c are each connected to U-shaped electrodes 54a, 54b, 54c which are each in contact, in the central region of the power modules 11, with both the first capacitor 44 and the second capacitor 45 and thus with one of the three groups of ten power modules 11 via a half-bridge (64 in FIG. 4). A circuit according to FIG. 4 is therefore implemented for each of the power modules 11, each group of power modules 11 being connected in parallel.

In the case of the capacitor arrangement 14 according to FIG. 5, a first electrode 18 and the second electrode 19 are used to establish contact with the capacitors 15 in the manner described in respect of FIG. 1. As shown in FIG. 5, five capacitors 15 are stacked vertically and two capacitors side by side. In contrast to FIG. 1, the capacitor structure 14 has an electrically insulating material 55. This consists according to FIG. 5 of plastic, the first electrode 18 and the second electrode 19 being injected into the material 55 so that contact can be established with the capacitors 15 (so-called assembly injection molding).

The material 55 is shown only partially in FIG. 5. The housing structure formed by the material 55 is largely broken open, wherein only the outlines 55a formed by the material 55 are indicated by dash-dotted lines. The structures indicated inside the material can therefore be identified in FIG. 5. In addition to the first electrode 18 and second electrode 19 and the capacitors 15, these also include electrical pathways 56 which are constituted by metallic conductors and electrically connect the upper side 50 with the mounting side of the capacitor arrangement 14. On the mounting side the pathways form contact structures 57 which can be contacted on a substrate board (cf. 12 in FIG. 1) if appropriate contact pads are provided thereon.

The driver circuit 49 according to FIG. 4 can be disposed on the upper side 50. The pathways 56 can be used to enable it to control the power electronic components 31 disposed on the substrate board according to FIG. 2. For this purpose conductor tracks 58 and contact pads 59 are provided on the upper side 15, the contact pads 59 being electrically connected to the pathways 56.

The sidewall formed by the electrode 19 is additionally used to accommodate a cooling structure 60 as a structural framework, wherein the cooling structure 60 consists of a passive aluminum cooler having ribs 61. Alternatively (not shown) an active cooler having a cooling channel can be used which has an inlet and an outlet for a preferably liquid coolant.

FIG. 6 shows another power module 11. This is mounted in the manner already described on a substrate board 12, the latter having power electronic components 31 and spacers 36 (arrangement as in FIG. 2). The capacitor structure 14 is only shown schematically and can be set up as shown in FIG. 5. A sensor element 25b which can be e.g. a temperature sensor or a humidity sensor or an acceleration sensor is attached to the sidewall 22. In the exemplary embodiment according to FIG. 6, the sensor signal can be fed via a signal line 62 to a driver circuit (not shown in greater detail) on the substrate board 12.

As an additional structural framework, the power module 11 according to FIG. 6 has a shielding structure 63 which can consist of a metal grid, for example. This provides electromagnetic shielding for the power module in order to ensure interference-free operation.

The invention claimed is:

1. A capacitor structure comprising: a plurality of capacitors disposed in a support structure, wherein each of the plurality of capacitors includes a first capacitor electrode and a second capacitor electrode;
    the support structure includes a first rigid electrically conducting electrode and a second rigid electrically conducting electrode;
    each of the plurality of capacitors makes electrical contact with the first rigid electrically conducting electrode via the respective first capacitor electrode and with the second rigid electrically conducting electrode via the respective second capacitor electrode;

the support structure includes a mounting side for surface mounting, the mounting side comprising a first contact area of the first rigid electrically conducting electrode and a second contact area of the second rigid electrically conducting electrode;

the support structure defines a cuboid interior and the capacitors are disposed in the cuboid interior;

an outer side of the support structure defines an additional structural framework outside the mounting side;

wherein the structural framework includes a circuitry carrier.

2. The capacitor structure as claimed in claim 1, wherein:
the first rigid electrically conducting electrode and the second rigid electrically conducting electrode form opposite sidewalls of the interior of the support structure;
the sidewalls extend perpendicularly away from the first contact area and the second contact area; and
the capacitors are disposed between the sidewalls.

3. The capacitor structure as claimed in claim 1, wherein the structural framework includes a reinforcing structure.

4. The capacitor structure as claimed in claim 1, wherein the structural framework includes electrical pathways running from the mounting side to an upper side of the capacitor structure.

5. The capacitor structure as claimed in claim 1, wherein the structural framework includes a cooling structure.

6. The capacitor structure as claimed in claim 1, wherein the structural framework comprises a sensor element.

7. The capacitor structure as claimed in claim 1, further comprising a driver circuit for a power electronic component mounted on the circuitry carrier.

8. The capacitor structure as claimed in claim 1, wherein the structural framework includes an electrical shielding structure at least partially encasing the capacitor structure.

9. The capacitor structure as claimed in claim 1, wherein the interior of the support structure is encapsulated.

10. The capacitor structure as claimed in claim 1, wherein the support structure includes an electrically insulating material into which the first electrode and the second electrode are incorporated.

11. The capacitor structure as claimed in claim 10, further comprising a seating for the structural framework formed from the electrically insulating material.

12. A power module comprising:
a power electronic component mounted on a substrate board; and
a capacitor structure comprising:
a plurality of capacitors disposed in a support structure, wherein each of the plurality of capacitors includes a first capacitor electrode and a second capacitor electrode;
the support structure includes a first rigid electrically conducting electrode and a second rigid electrically conducting electrode;
each of the plurality of capacitors makes electrical contact with the first rigid electrically conducting electrode via the respective first capacitor electrode and with the second rigid electrically conducting electrode via the respective second capacitor electrode;
the support structure includes a mounting side for surface mounting, the mounting side comprising a first contact area of the first rigid electrically conducting electrode and a second contact area of the second rigid electrically conducting electrode;
the support structure defines a cuboid interior and the capacitors are disposed in the cuboid interior;
an outer side of the support structure defines an additional structural framework outside the mounting side
wherein the capacitor structure is in electrical contact with the power electronic component.

13. The power module as claimed in claim 12, wherein the power electronic component is mounted on one side of the substrate board and the capacitor structure on an opposite side of the substrate board.

* * * * *